United States Patent [19]

Hopkins

[11] Patent Number: 5,118,191
[45] Date of Patent: Jun. 2, 1992

[54] HIGH CONTRAST SWITCHABLE TARGET DISCRIMINATOR

[75] Inventor: F. Kenneth Hopkins, Springboro, Ohio

[73] Assignee: The United States of America as represented by the Secretary of the Air Force, Washington, D.C.

[21] Appl. No.: 529,817

[22] Filed: May 29, 1990

[51] Int. Cl.$^5$ .............................................. G05D 1/00
[52] U.S. Cl. .................................. 356/368; 180/168; 250/225
[58] Field of Search ............... 356/364, 365, 368, 369; 250/222.1, 225; 350/384, 385; 180/168

[56] References Cited

U.S. PATENT DOCUMENTS

| | | | |
|---|---|---|---|
| 3,443,072 | 10/1964 | Mori | 235/61.11 |
| 3,502,888 | 7/1967 | Stiles | 250/219 |
| 3,631,415 | 12/1971 | Aagard et al. | 356/369 |
| 3,881,568 | 5/1975 | Ando et al. | 180/168 |
| 3,935,922 | 2/1976 | Cooper et al. | 180/98 |
| 4,328,422 | 5/1982 | Loomer | 250/239 |
| 4,339,660 | 7/1982 | Buchholz et al. | 250/225 |
| 4,379,497 | 4/1983 | Hainsworth et al. | 180/168 |
| 4,656,406 | 4/1987 | Houskamp | 318/587 |
| 4,775,023 | 10/1988 | Shimada et al. | 180/168 |
| 4,816,761 | 3/1989 | Josephs | 356/369 |
| 4,922,200 | 5/1990 | Jackson et al. | 356/369 |
| 4,931,634 | 6/1990 | Toyama | 250/225 |

FOREIGN PATENT DOCUMENTS 0335163 10/1989 European Pat. Off. ............ 356/369
1038402 3/1962 United Kingdom .

OTHER PUBLICATIONS

"Innovative Displays are Based on PLZT Ceramic" *Optical Spectra* (vol. 9, No. 5) (May 1975) p. 35.
Guided Vehicles End Delivery Delays, Russ Gager, Jun. 1986, pp. 24-27.
AGVs Get True Guidepath Flexibility GeneSchwind. Materials Handling Engineering Jun., 1986.
Mobolizing a Robotic Arm for IC Programming, Robert Bain, Robotics Engineering, May, 1986.
AGVs Boost Productivity In Precision Assembly, Modern Materials Handling, Jun., 1985.

*Primary Examiner*—Richard A. Rosenberger
*Attorney, Agent, or Firm*—Fredric L. Sinder; Donald J. Singer

[57] ABSTRACT

A high contrast remotely switchable target discriminator, particularly suitable for use with automatic guided vehicles (AGVs), is disclosed. A laser light source directs light through a first polarizer to reflect off a beam splitter toward a target, which may be an AGV guidepath. The target comprises a reflecting material overlaid with a polarization rotator so that the light then reflected from the target has a polarization different from that from the original light source. The reflected light transmits back through the beam splitter to a second polarizer that transmits only light of the rotated polarization. Light that passes through the second polarizer then strikes a detector. A second polarizer-detector combination may be set to transmit and detect only light of the non-rotated polarization so that a sufficiently large ratio of the two different polarizations may be tested. The polarization rotator may be made of electro-optically birefringent material overlaying a reflector so that the polarization rotation may be switched either on and off, or proportionally, to turn a target either on or off or to identify a particular target. The polarization rotator may also be made of electro-optically birefringent material overlaying a dielectric stack.

1 Claim, 3 Drawing Sheets

HIGH CONTRAST SWITCHABLE TARGET DISCRIMINATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to apparatus for detecting the presence of a specially constructed target, and more specifically to a novel high contrast target discrimination system, particularly suitable for automatic guided vehicles, that can be quickly and remotely switched to choose from among a plurality of targets or guidepaths.

Automatic guided vehicles (AGVs) are unattended industrial vehicles for automatically moving material between and within warehouses, offices and factories. The guidance systems for AGVs need to be very accurate AGV guidance systems generally use floor-mounted guidepaths that the guidance system detects and follows. The prior art includes such guidepaths as buried wires, called guide wires, that are detected by the presence of a magnetic field around the wires that results from running an electric current through the wires; and painted or taped lines, called guidelines, that are detected by the reflection of a bright light source from the lines. An alternative to floor-mounted guidepaths are retroreflective targets mounted aboveground throughout a building that an optical guidance system "sees" by reflecting light off the target and then computing its location.

A disadvantage of guide wire, or wire-guided, AGV guidance systems is that they generally are not flexible enough to deal with the constantly changing work flow of modern manufacturing and warehousing environments. Each change requires cutting costly new slots into the floor for the wires. Wire-guided systems can, however, be wired like a model railroad set to provide remotely selectable multiple guidepaths.

Guideline, or other reflected light, systems require a high contrast between background illumination and the light reflected from the guidelines or target. A useful reflected light guidepath system is disclosed in U.S. Pat. No. 3,935,922 to Cooper et al. The Cooper et al patent discloses directing ultraviolet light onto a line containing fluorescent material to cause the guideline to fluoresce and re-emit visible light which is detected by photocells. Such fluorescent systems inherently achieve some increased contrast because the fluorescent material emits light at a particular wavelength for which the detection system can filter the incoming light to better discriminate. This also eliminates the problem with some visible light reflecting systems that can be fooled by light reflected back from other shiny surfaces. The contrast is additionally increased by modulating the output ultraviolet light at a preselected frequency so that the fluorescently re-emitted visible light is similarly modulated and the detector can selectively filter out background illumination of the same wavelength, but not the same modulation frequency.

Other prior art reflected light systems increase contrast by using polarized emitted and reflected light. These systems typically direct polarized light at a target that reflects the light without changing the polarization. Light reflected from areas other than the target, or specially marked portions of the target, are reflected with a generally more random polarization so that less light from non-target areas will pass through a polarizing filter placed in front of a detector than will the more highly polarized light from the target. The prior art also includes using bulky and awkward corner reflectors as targets to rotate the polarization of the reflected light by 90° and then detecting for the thus rotated polarized light.

Unfortunately, like buried wire systems, optical guidepath guidance systems suffer from a number of disadvantages. For example, guidelines frequently, especially in hostile environments, become covered with dirt and are damaged by foot and machinery traffic. Also, fluorescent systems cannot practically be used with retroreflective targets because projecting a beam of ultraviolet light more than ten feet generally requires an ultraviolet laser, which is both expensive and dangerous to personnel in the area. Moreover, the re-emitted visible light from the fluorescent target will generally be too weak to be detected at practical distances.

The increased flexibility offered by the lower cost of placing new optical guidelines over installing new buried guide wires has made optical guidepaths the more common choice in industry. Unfortunately, this flexibility so far extends only to the ease of placing new guidelines. The prior art has not found a means for adding to guideline systems the desirable remote and quick switching among different guidepaths that is found in some guide wire systems. The prior art does include means for semi-permanent routing changes to, for example, branch lines by painting dark cross-bars, also used to indicate stops, across the guidepath before the beginning of a branch line to signal the AGV to make a turn onto the branch line. Typically, such systems are designed so that the AGV will always make a right turn at a junction, except where a particular sequence of cross-bars are present before the junction. In working environments where repeated changes are desirable, having to remove and/or repaint crossbars each time a change is desired is awkward and inconvenient. Moreover, the changes cannot, of course, be performed remotely.

Thus it is seen that there is a need for optical guideline AGV guidance systems that can be quickly and remotely switched among different guidelines.

It is, therefore, a principal object of the present invention to provide a high contrast target discrimination system, particularly suitable for automatic guided vehicles, that can be quickly and remotely switched to choose from among a plurality of targets or guidepaths.

It is another object of the present invention to provide an improvement to polarization methods used in reflected light target discrimination systems for AGVs.

It is a feature of the present invention that its capability to remotely switch among various guidepaths can also be used to remotely stop and start AGVs.

It is another feature of the present invention that conventional controllers can be easily adapted for use with the invention.

It is a further feature of the present invention that it is particularly suitable for use with retroreflective targets.

It is an advantage of the present invention that it provides the high contrast of fluorescent systems without the accompanying disadvantage of short range.

It is another advantage of the present invention that its implementation will be straightforward and uncomplicated.

These and other objects, features and advantages of the present invention will become apparent as the description of certain representative embodiments proceeds.

SUMMARY OF THE INVENTION

The present invention provides a novel high contrast target discrimination system, particularly suitable for automatic guided vehicles, that can be quickly and remotely switched to choose from among a plurality of targets or guidepaths. The unique discovery of the present invention is that increased contrast can be provided for target discrimination systems that use polarization of the emitted and reflected light by the additional use of birefringent material over the targets and guidelines. Further, using electro-optically birefringent material for which the birefringence can be switched on and off, or proportionally, by an applied electrical or other signal, adds the capability of remotely switching among various targets or guidelines Another unique discovery is that polarization discrimination can be increased by detecting not only for, for example, the y-component of reflected polarized light, but also for a sufficiently large ratio of the y-component to the x-component.

Accordingly, the present invention is directed to a target discrimination system comprising means for emitting polarized light having a first polarization vector, reflecting means for receiving polarized light having the first polarization vector and emitting polarized light having a second polarization vector, wherein the reflecting means comprises a reflecting material overlaid with a birefringent material, and means for detecting threshold levels of polarized light having the second polarization vector. The reflecting means may be an optical guidepath for automatic guided vehicles.

The invention is also directed to a target discrimination system comprising means for emitting polarized light having a first polarization vector, reflecting means for receiving polarized light having the first polarization vector and emitting polarized light having a second polarization vector, wherein the second polarization vector comprises a larger y-component polarization vector and a smaller x-component polarization vector, and means for detecting threshold levels of polarized light having the second polarization vector, wherein the detecting means includes means for detecting threshold levels of the ratio of the y-component polarization vector to the x-component polarization vector.

The invention is further directed to a target discrimination system comprising means for emitting polarized light having a first polarization vector, reflecting means for receiving polarized light having the first polarization vector and emitting polarized light having a second polarization vector, wherein the reflecting means includes means for switching the second polarization vector between equal to and unequal to a third polarization vector, and means for detecting threshold levels of polarized light having the third polarization vector. The invention may include means for remotely controlling the means for switching the second polarization vector. The means for switching the second polarization vector may comprise a reflecting material overlaid with an electro-optically birefringent material. The ordinary and extraordinary indices of refraction of the electro-optically birefringent material and the one or more indices of refraction of the reflecting material may be selected so that a phase shift of the extraordinary component of an incoming light beam will not occur when the beam reflects from an interface between the electro-optically birefringent material and the reflecting material. The electro-optically birefringent material may have indices of refraction $n_o$ and $n_e$ and the reflecting material an index of refraction $n_r$, wherein $n_r$ is between $n_o$ and $n_e$. The reflecting means may be an optical guidepath for automatic guided vehicles.

The invention is yet further directed to a target discrimination system comprising means for emitting polarized light having a first polarization vector, reflecting means for receiving polarized light having the first polarization vector and emitting polarized light having a second polarization vector, wherein the reflecting means includes means for switching between emitting polarized light having the second polarization vector and not so emitting, and means for detecting threshold levels of polarized light having the second polarization vector. The invention may include means for remotely controlling the means for switching between emitting and not emitting.

The invention is still further directed to a target discrimination system comprising means for emitting polarized light having a first polarization vector, a plurality of reflecting means for receiving polarized light having the first polarization vector and emitting polarized light having a second polarization vector, wherein each reflecting means includes means for switching the second polarization vector between equal to and unequal to a third polarization vector, and means for detecting threshold levels of polarized light having the third polarization vector. The invention may include means for remotely controlling, for each reflecting means, the means for switching the second polarization vector so that only one reflecting means at a time will emit reflected polarized light having a second polarization vector equal to the third polarization vector.

The invention is additionally directed to a target discrimination system comprising means for emitting polarized light having a first polarization vector, reflecting means for receiving polarized light having the first polarization vector and emitting polarized light having a second polarization vector, wherein the second polarization vector comprises a larger y-component polarization vector and a smaller x-component polarization vector, and wherein the reflecting means includes means for switching the second polarization vector between equal to and unequal to a third polarization vector, and means for detecting threshold levels of polarized light having the third polarization vector, wherein the detecting means includes means for detecting threshold levels of the ratio of the y-component polarization vector of the third polarization vector to the x-component polarization vector of the third polarization vector.

DESCRIPTION OF THE DRAWINGS

The present invention will be more clearly understood from a reading of the following detailed description in conjunction with the accompanying drawings wherein.

DETAILED DESCRIPTION

Figure 1:
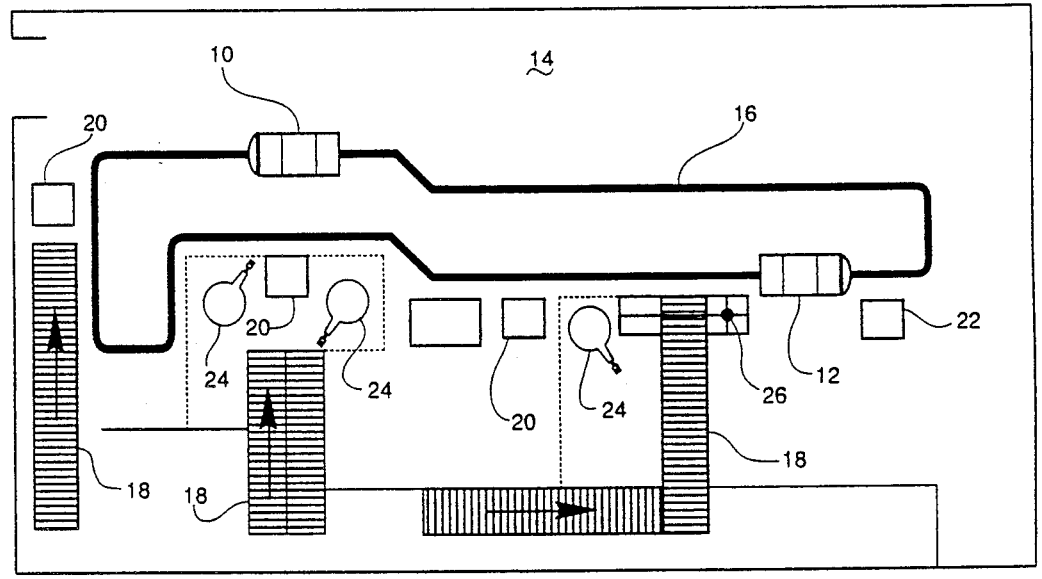
FIG. 1 is a schematic plan view of a pair of AGVs in an example factory area showing the AGVs and their optical guidepath for guiding the AGVs among input conveyors, work stations and an output station.

Referring now to FIG. 1 of the drawings, there is shown a schematic plan view of a pair of AGVs 10 and 12 in an example factory area 14 showing AGVs 10 and 12 and their optical guidepath 16 for guiding them among input conveyors 18, work stations 20 and an output station 22 for operations by, for example, vision-guided robots 24 and gantry-robot 26.

Figure 2:
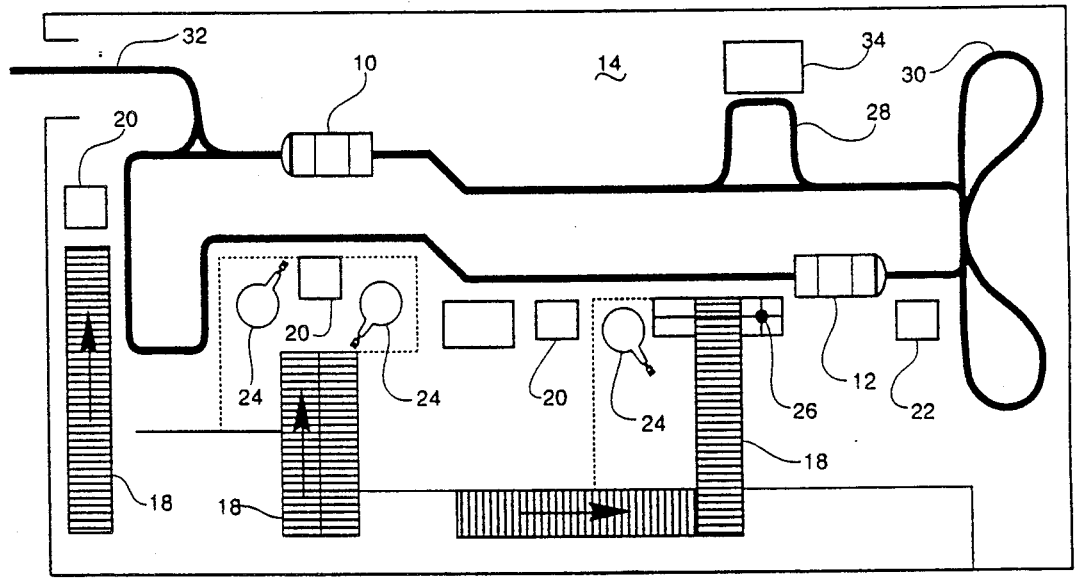
FIG. 2 is a schematic plan view of the example optical guidepath layout of FIG. 1 modified as made possible by the teachings of the present invention.

FIG. 2 is a schematic plan view of the example optical guidepath layout of FIG. 1 modified as made possible by the teachings of the present invention. Optical guidepath 16 now also includes new branch lines 28, 30 and 32. Branch line 28 provides an alternative path to new work station 34. Branch line 30 provides a route for reversing the direction of AGVs 10 or 12. Branch line 32 provides a route for entering or leaving factory area 14. Applicant's invention, as later described, makes possible remotely controllable switching of movement of AGVs 10 and 12 along these alternative routes. Those with skill in the art, particularly upon appreciating the detailed description of FIGS. 3 and 4, will readily see a great number of other valuable modifications that may be made to prior art optical guidepath systems by use of the teachings of the present invention.

Figure 3:
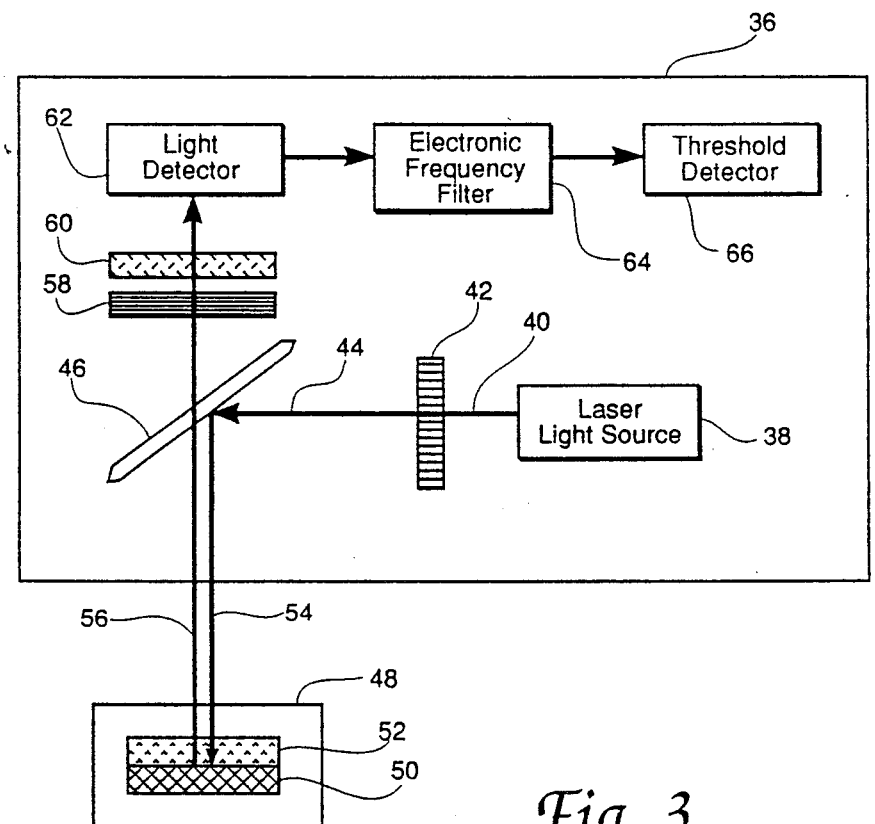
FIG. 3 is a simplified schematic view of the polarization subsystem of a target discrimination system according to the teachings of the present invention.

FIG. 3 is a simplified schematic view of the polarization subsystem 36 of a target discrimination system according to the teachings of the present invention. For simplicity, lenses and like elements are not shown. A laser light source 38 projects a light beam 40, typically modulated, through a polarizer 42 that transmits only light having a polarization vector in an arbitrary x-direction. Polarized light beam 44 then strikes a beam splitter 46, typically a partially-silvered mirror, that reflects part of polarized light beam 44 toward a target 48. Target 48 comprises a reflector 50 overlaid with a polarization rotator 52. Polarization rotator 52 rotates the polarization vector of incoming beam 54 from its x-direction to an arbitrary y-direction. Reflected beam 56 travels back through beam splitter 46, y-direction polarizer 58 and color filter 60 to reach light detector 62. The signal from detector 62 is fed through an electronic frequency filter 64 and a threshold detector 66. Examination of polarization subsection 36 shows that detector 62, and ultimately threshold detector 66, will preferentially respond only to light from light source 38 and reflected from target 48. Light from light source 38, but reflected from other than target 48 will generally have an x-direction polarization vector and will at best only partially pass through polarizer 58. Color filter 60 and electronic frequency filter 64 provide additional discrimination. It will be seen by those with skill in the art that the addition of polarization rotator 52, typically made of an optically birefringent material, greatly increases the contrast of the target discrimination system over that provided by prior art systems that depend merely upon the preferential reflection of polarized light from a target compared to more randomly polarized background reflection. As with fluorescent systems, the modification made at the guide path target to the light beam originating from light source 38 increases the contrast against reflections from other bright objects, but without the short range penalty of fluorescent systems.

A second polarizer-light detector combination, similar to polarizer 58-light detector 62, can be set up also in the path of reflected light beam 56, but with an x-direction polarizer. This arrangement will permit detecting for the x-direction component of light beam 56 in addition to the y-direction component so that a test may be made for a sufficiently large ratio of the y-component to the x-component so that even greater discrimination can be achieved.

Figure 4:
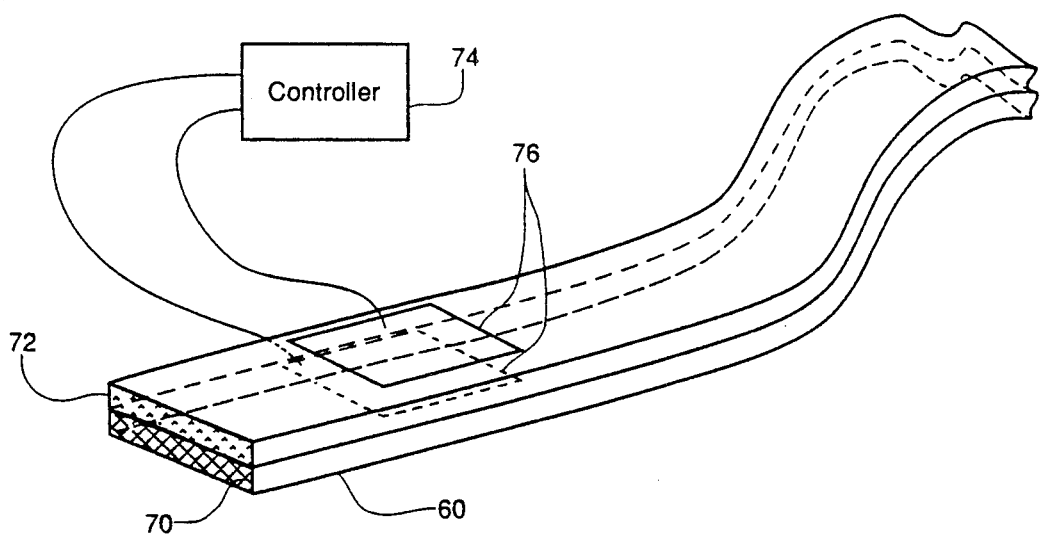
FIG. 4 is a perspective view of a segment of a birefringent optical guidepath according to the teachings of the present invention; and, FIG. 5 shows another perspective view of a segment of a birefringent optical target, or guidepath, according to the teachings of the present invention.

FIG. 4 is a perspective view of a segment of a birefringent optical guidepath 68 according to the teachings of the present invention. Optical guidepath 68 can be remotely switched between rotating the polarization vector of a reflected beam of light and not rotating, or rotating a preselected amount. Optical guidepath 68 comprises a reflector 70 and an electro-optical covering material 72. Electro-optical material 72 will, under application of a voltage creating an electric field, become birefringent so that the polarization vector of an incident light beam will be rotated upon reflection. When used as part of the polarization detection apparatus of FIG. 3, voltage can be applied to electro-optical material 72 so that it will rotate the polarization vector of incident beam 54 from the x-direction to a y-direction in the reflected beam. Reflected beam 56 will then pass through polarizer 58 and reach detector 62. When the voltage is removed, electro-optical material 72 will transmit light having an x-direction polarization vector without rotation so that reflected beam 56 will be blocked by y-direction polarizer 58 and not reach detector 62. A controller 74, which can be placed at a remote location, switches the voltage applied to electro-optical material 72 through variously placed contacts 76 to change the direction of the polarization vector of light reflected from the guidepath. Those with skill in the art will see that a great variety of different arrangements of contacts 76 may be made to achieve different aims. These arrangements may include spot controls, as shown, or more extended contacts. FIG. 4 is intended to be representative and not limiting for the variety of possible contact methods and configurations.

Electro-optical materials are transparent materials which undergo refractive-index changes either directly proportional to an applied electric field, called the Pockels effect, occurring generally in solid crystals; or, proportional to the square of the applied electric field, called the Kerr effect, occurring generally in liquids and gases. The effect can be proportional so that, in addition to on-off switching of birefringence, the use of either multiple polarizers, or making polarizer 42 from electro-optical material and modulating its polarization switching, AGVs can separately recognize a plurality of different guidepaths, or different AGVs can be separately controlled along the same guidepath.

The guidepath may be protected, if needed, by encasing inside a transparent flexible covering. Those with skill in the art of the invention will readily see a variety of other means for providing protection to the guidepath if needed.

Figure 5:
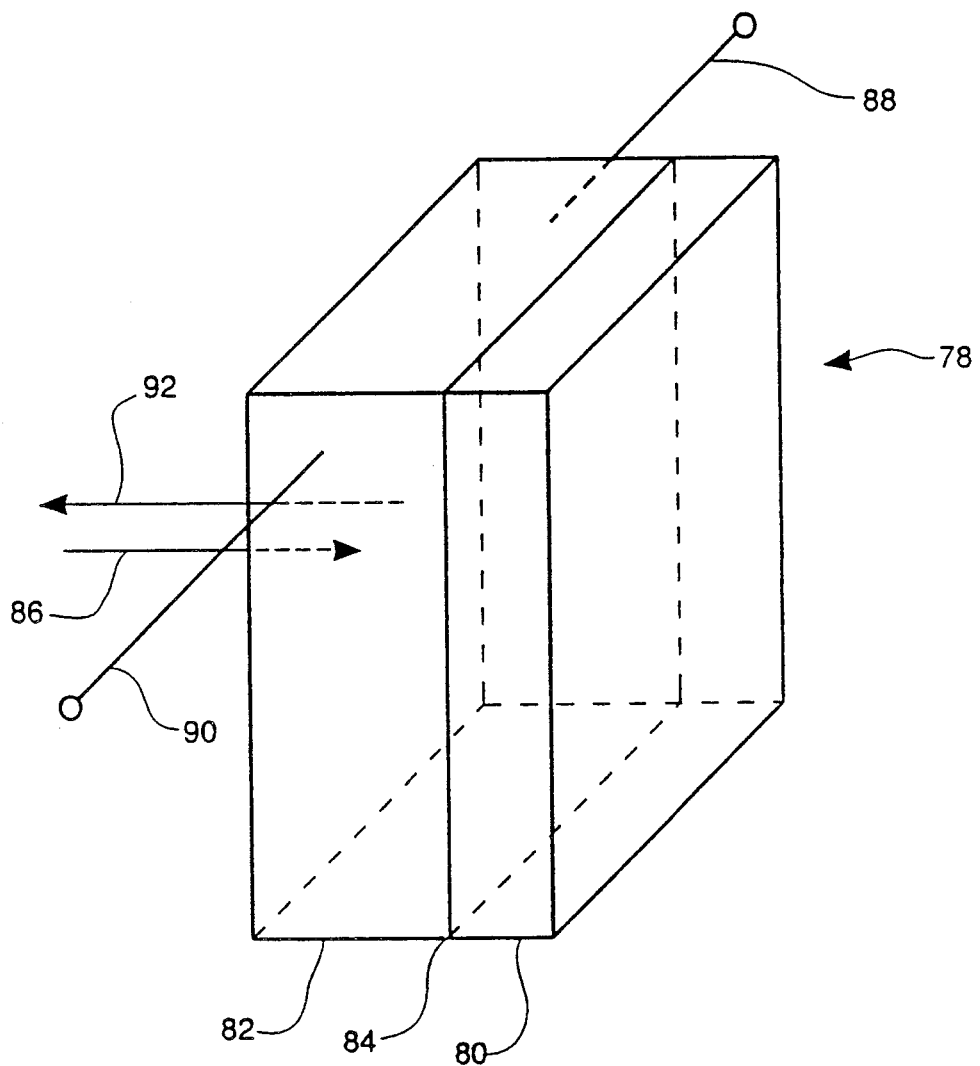

FIG. 5 shows another perspective view of a segment of a birefringent optical target, or guidepath, 78 according to the teachings of the present invention. Target 78 comprises a reflector 80 and electro optical covering material 82. Reflector 80 and electro-optical covering material 82 meet at interface 84. A polarized light beam 86 enters target 78 and has its polarization vector either rotated or not rotated according to whether or not an electric field is created by application of a voltage through leads 88 and 90. When no field is applied, the two principal perpendicular indices of refraction of covering material 82, conventionally known as $n_o$ and $n_e$ (ordinary and extraordinary indices of refraction) are typically equal. When a voltage is applied, $n_e$ changes to create the birefringence effect. If, as would generally be expected, both $n_o$ and $n_e$ are less than the index of refraction $n_r$ of reflector 80, both components (ordinary and extraordinary) of light beam 86 will undergo an 180° phase shift upon reflecting from interface 84 and can travel back through covering material 82 along the same path that they entered, so that the net recombined reflected light beam 92 will have the same polarization vector as light beam 86. To avoid this possibility, $n_r$ should generally be greater than $n_o$ and less than $n_e$ in order that the extraordinary component of incoming light beam 86 will not undergo a phase shift. In this way, target 78 will rotate the polarization vector. These arrangements have the unfortunate side effect, however, of possibly reducing reflectivity and the resulting intensity of reflected light beam 92. Another possible structure to avoid an unintended net non-rotation of the polarization vector of incoming light beam 86, and to substantially avoid a reduction in the intensity of reflected light beam 92, is to make reflector 80 a dielectric stack, or other structure, such as a rugate filter, that varies its refractive index with depth. This, among other dynamic effects, will increase the number of reflective interfaces and thereby increase reflectivity. Those with skill in the art will recognize that the birefringent material is not restricted to materials relying on either the Pockels or Kerr effects from electric fields. Magneto-optical materials may also be used. Other materials, such as ferroelectric liquid crystals, are also available. Such ferroelectric liquid crystals tend to be more bistable, i.e., either on or off, than the slightly more proportional Pockels and Kerr effects. Also, some materials exhibit piezo-birefringence effects in which pressure causes changes in the refractive index of the material. Moreover, the invention is not restricted to the use of any particular part of the electromagnetic spectrum. Other frequencies, combined with other switchable physical properties and characteristics of other materials may also be used. Other means for utilizing and changing the physical properties or characteristics of radiation and materials, both those now known or discovered in the future, may also be used.

The disclosed switchable target discrimination system successfully demonstrates the use of a polarization rotator, particularly an optically birefringement material, over an optical guidepath or target to enhance contrast and discrimination. The disclosed system also successfully demonstrates the utility of using the electro-optical, and other physical, properties of various materials to provide remote switching, and other advantageous capabilities, to target discrimination systems. Although the disclosed apparatus and method is specialized, its teachings will find application in other areas where increased discrimination and control are required.

It is understood that modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A target discrimination system for an automatic guided vehicle, comprising:
   (a) means for emitting polarized light having a first polarization vector, wherein the polarized light emitting means is mounted on the automatic guided vehicle;
   (b) reflecting means for receiving polarized light having the first polarization vector and emitting polarized light having a second polarization vector, wherein the reflecting means includes means for switching the second polarization vector between equal to and unequal to a third polarization vector, and wherein the reflecting means comprises an optical guidepath for, and in a spaced relationship from, the automatic guided vehicle; and,
   (c) means for detecting threshold levels of polarized light having the third polarization vector, wherein the detecting means is mounted on the automatic guided vehicle.

* * * * *